United States Patent [19]

Parthasarathy

[11] 4,139,291

[45] Feb. 13, 1979

[54] SYSTEM AND METHOD FOR OBTAINING WIDE SCREEN SCHLIEREN PHOTOGRAPHS

[76] Inventors: Robert A. Frosch, Administrator of the National Aeronautics and Space Administration, with respect to an invention of Shakkottai P. Parthasarathy, Burbank, Calif.

[21] Appl. No.: 876,441

[22] Filed: Feb. 9, 1978

[51] Int. Cl.² .................... G03B 29/00; G02B 5/30; H01J 3/14
[52] U.S. Cl. .................... 354/77; 250/237 G; 356/129
[58] Field of Search .................... 250/237 G; 356/107, 356/129; 355/44, 77; 354/77

[56] References Cited

U.S. PATENT DOCUMENTS

| | | | |
|---|---|---|---|
| 2,541,437 | 2/1951 | Prescott | 356/129 |
| 2,636,415 | 4/1953 | Zobel | 356/107 |
| 2,805,599 | 9/1957 | Pajes | 356/129 X |
| 2,977,847 | 4/1961 | Meyer-Arendt | 356/129 X |
| 3,897,136 | 7/1975 | Bryngdahl | 250/237 G X |

OTHER PUBLICATIONS

Nov. 1949, Journal of the Optical Society of America, vol. 39, No. 11, pp. 907-908.
Jan. 1950, The Review of Scientific Instruments, vol. 21, No. 1, pp. 3-6.
1965, Journal of Scientific Instruments, vol. 42, pps. 607-610.
May 1963, Scientific American, Moiré Patterns, pp. 53-62.

*Primary Examiner*—Donald A. Griffin
*Attorney, Agent, or Firm*—Monte F. Mott; John R. Manning; Wilfred Grifka

[57] ABSTRACT

A system for use in Schlieren photography including a large grating, a viewing screen adjacently related to the large grating, a small grating disposed in spaced relation with the large grating, a transparent retainer for confining a transparent medium between the gratings, and optics for imaging the small grating on the large grating including a light source and optically aligned lens for projecting a beam of light along axes extending through the small grating and striking the large grating, subsequent to passing through the medium for thus forming on the screen a Schlieren image of striations resulting from distortions of light rays produced by the medium, and a camera for photographing the Schlieren image projected on the large screen.

8 Claims, 3 Drawing Figures

SYSTEM AND METHOD FOR OBTAINING WIDE SCREEN SCHLIEREN PHOTOGRAPHS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention:

The invention generally relates to Schlieren photography and more particularly to a system and method for obtaining wide screen Schlieren photographs.

2. Description of the Prior Art

As discussed by Ralph A. Burton, *Journal of the Optical Society of America*, Volume 39, No. 11, November 1949, Schlieren systems of the conventional type generally possess the following limitations:

(1) the area of field is limited to the area of the lens or mirror used to focus the light,
(2) any striation between the light source and the knife edge employed appears on the screen along with those being studied, and
(3) the light source must approximate a point source.

Consequently, as also pointed out by Burton, a large lens, especially free from striations and correspondingly expensive, is required for large areas of field, and the choice of light source is sharply restricted.

The author of the paper aforementioned, in an effort to overcome the noted limitations without sacrificing sensitivity, such as occurs in the use of shadowgraphic methods, proposes the use of a method wherein a negative grid is rididly mounted in a camera for photographing striations illuminated by light propagated through a positive grid.

While such a method may satisfy the requirements of experimental work, it readily should be apparent that such a method and/or the system employed in performing the method, simply does not lend itself to practical application because of the requirements that a specialized camera be constructed to include therein a negative grid.

It should therefore be apparent that there currently exists a need for a practical and economic system through a use of which it is possible to obtain a wide screen Schlieren photograph of fields of view substantially unlimited in size employing simple and economic photographic equipment and techniques. Therefore, it is the general purpose of the instant invention to provide an improved system and method for obtaining wide screen Schlieren photographs without sacrificing desired resolution.

OBJECTS AND SUMMARY OF THE INVENTION

It is, therefore, an object of the instant invention to provide an improved system for obtaining wide screen Schlieren photographs.

It is another object to provide an improved method for obtaining wide screen Schlieren photographs.

It is another object to provide in a system for obtaining wide screen Schlieren photographs the improvement including optics for imaging a small grating on a large grating with a viewing screen adjacently related to the large screen whereby matter positioned between the projection lens and the large grating may be examined by examining photographed striations imaged on the screen and resulting from distortions of light rays projected through the medium.

Another object is to provide an improved method for obtaining Schlieren photographs which is particularly useful in connection with still photography, although not necessarily restricted in use thereto since the system and method may be equally useful when employed in connection with motion photography and/or optical viewing.

These and other objects and advantages are achieved through the use of a system which includes a projection lens for projecting a small grating on a large grating with a medium to be analyzed being at least partially confined between the projection lens and the large grating, and a viewing screen disposed in close proximity with the large grating whereby light passing through the medium is refracted from its normal course so that on arriving at the large grating refracted light is passed through the large grating for producing photographically reproduceable images of striae on the screen, as will become more readily apparent by reference to the following description and claims in light of the accompanying drawing.

DESCRIPTION OF THE PREFERRED EMBODIMENT

Figure 1:
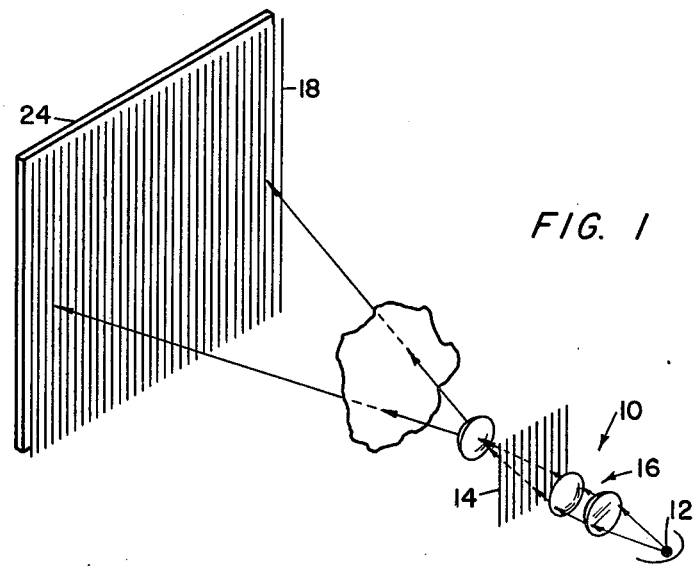
FIG. 1 is a diagrammatic view depicting a system which embodies the principles of the instant invention.

Referring now to the drawing with more particularity wherein like reference characters designate like or corresponding parts throughout the several views, there is diagrammatically illustrated in FIG. 1 an improved system which embodies the principles of the instant invention.

As shown in FIG. 1, the system, generally designated 10, includes a point source of light, designated 12. The source preferably comprises an arc light from which is propagated a beam of substantially high-intensity having an axis projected through a small grating 14. As a practical matter the small grating 14, as currently employed, comprises a standard two inch by two inch one thousand lines per inch grating.

Interposed between the small grating 14 and the light source 12 there is interposed a condensing lens system 16 the purpose of which is to direct the beam of light as a converging cone through the grating 14. Axially spaced along the optic axis of the condensing lens system 16 there is a large grating 18 fabricated in any suitable manner. As currently employed, the grating 18 includes a pair of horizontally extended steel rods, not shown, arranged in vertically spaced parallelism. As currently employed, the rods are characterized by a diameter of one-half inch spaced forty inches apart. Black nylon twine approximately 0.050 inches in diameter is passed back and forth between the rods and are uniformly spaced to provide twenty threads per inch along the rods. Thus the large grating is of a relatively simple and economic construction.

Interposed along the axis of the optic axis of the lens system 16, between the small grating 14 and the large grating 18, there is a projection lens system 20. This lens system serves to project a magnified image of the small grating on the large grating.

Figure 3:
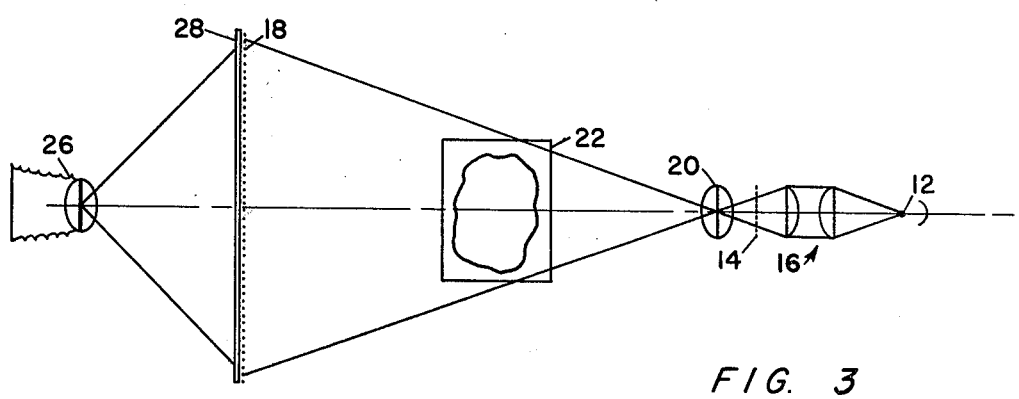
FIG. 3 is a top plan view of a modified form of the system.

Interposed between the projection lens system 20 and the large grating 18 there is disposed a retainer, identified by the reference numeral 22, FIG. 3, the purpose of which is to confine, at least in part, a medium to be photographed employing the system 10. As shown, the retainer comprises a tubular body formed of transparent material, such as a synthetic resin, into which a fluid medium is introduced. It will be appreciated that the particular retainer is dictated by the nature of the material being subjected to an examination and/or analysis, and, where so desired, comprises a tubular body for confining a flowing stream of the medium.

Figure 2:
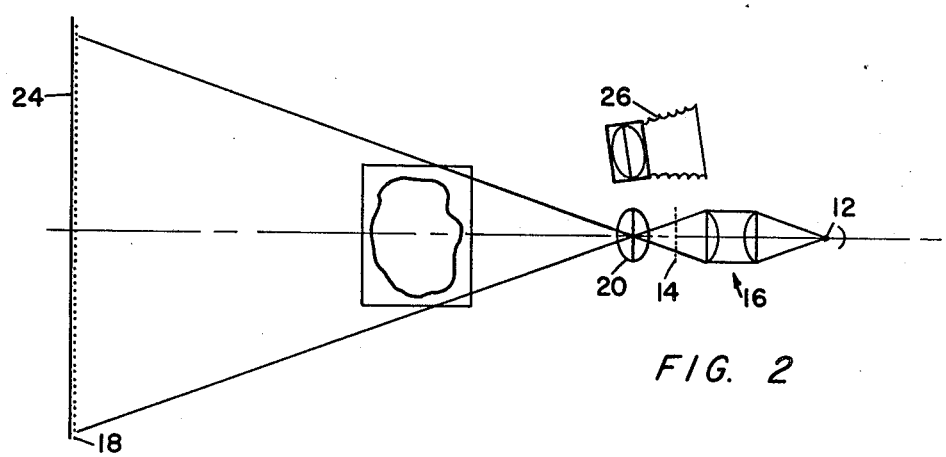
FIG. 2 is a top plan view of the system.

As shown in FIG. 2, immediately adjacent the large grating 18, in optic alignment with the lens system 20, there is provided a viewing screen 24 the purpose of which is to accommodate a display of images of striae produced by incident light refracted by the medium being examined and passed through the grating 18. Preferably, the screen includes a Scotchlight surface for enhancing reflection of incident light. In order to photograph the image projected onto the screen 24, by the lens 20, a conventional camera 26 is located at a suitable distance from the grating and focused thereon for purposes of photographically recording the images.

In order to enhance the sensitivity of the system a Fresnel lens 28 is provided, as illustrated in FIG. 3 in lieu of the viewing screen 24. A very low-cost Fresnel lens system including multiple elements separately focused may be employed. Where the Fresnel lens is used, the camera 26 is so positioned that the lens thereof is in optical alignment with the system 10. Moreover, since the Fresnel lens need not be a single element a relatively inexpensive Fresnel system can be employed without sacrificing resolution.

It is important to understand that because the retainer 22 is positioned between the lens 20 and the grating 18 there is no particular limit as to the size of the large grating 18. Consequently, Schlieren photographs limited to a size only by practical matters such as the intensity of the light source employed and the sensitivity of the camera and its lens are obtainable.

OPERATION

It is believed that in view of the foregoing description, the operation of the device will readily be understood and it will be briefly reviewed at this point.

Employing the system illustrated in FIGS. 1 and 2 a fluid to be analyzed is deposited in the retainer 22. Where desired, the medium may be delivered into ambient atmosphere. In any event, a beam of light proportional from the source 12 is focused by light from the condensing lens system 16, through the grating 14, on the projection lens 20. The beam, of course, is broken into multiple components by the grating 14 and is refracted as it is projected by the lens system 20 through the medium. The light of the components of the beam is refracted from its normal course, by the medium, so that the rays thereof no longer fall on the threads of the grating 18 but instead pass therethrough to strike the surface of the viewing screen 24, or Fresnel lens 28, as the case may be, for thus providing a Schlieren image of the refracting medium. The images thus formed are then photographed employing the camera 26.

In view of the foregoing, it should readily be apparent that the system which embodies the principles of the instant invention comprises a low cost system capable of obtaining wide screen Schlieren photographs employing conventional cameras and techniques.

What I claim is:

1. In a system for obtaining wide screen Schlieren photographs, the improvement comprising:
    A. means defining a small grating including a plurality of bars arranged in coplanar parallelism;
    B. a large grating;
    C. means for imaging said small grating on said large grating including a source of light and a condensing lens for projecting a beam of light along an optic axis extended through said small grating, and projection lens aligned along said axis in spaced relation with the small grating for projecting a magnified image of said small grating on said large grating; and
    D. a viewing screen adjacently related to said large grating, whereby striae produced in the medium is imaged.

2. The improvement of claim 1 further comprising means for positioning material to be examined between said projection lens and said large grating.

3. The improvement of claim 1 further comprising means for photographing images projected on said screen.

4. The improvement of claim 3 wherein the viewing screen comprises a Fresnel lens.

5. The improvement of claim 4 further comprising camera means disposed in axially spaced relation with said viewing screen for photographing images projected on said screen.

6. The improvement of claim 3 wherein said viewing screen comprises a light reflective surface.

7. The improvement of claim 6 wherein said means for photographing images projected on said screen includes a camera having an optic axis angularly related to the plane of said reflective surface.

8. A method for obtaining wide screen Schlieren photographs, the steps comprising:
    A. directing a beam of light along a path extended from a source through a small grating to a projection lens and thence to a large grating for thus projecting a magnified image of the small grating on the large grating;
    B. positioning material to be examined between said projection lens and said large grating; and
    C. photographing the image projected on said large grating.

* * * * *